United States Patent
Han et al.

(10) Patent No.: US 9,516,156 B2
(45) Date of Patent: Dec. 6, 2016

(54) APPARATUS AND METHOD FOR PROVIDING BOOKMARK SERVICE IN COMMUNICATION TERMINAL

(75) Inventors: Zhong-Hai Han, Seoul (KR); Ae-Jung Seo, Seoul (KR); Sung-Cheol Kim, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 12/965,182

(22) Filed: Dec. 10, 2010

(65) Prior Publication Data

US 2011/0145688 A1 Jun. 16, 2011

(30) Foreign Application Priority Data

Dec. 11, 2009 (KR) ........................ 10-2009-0122919

(51) Int. Cl.
| | |
|---|---|
| G06F 17/00 | (2006.01) |
| H04M 1/725 | (2006.01) |
| G06F 17/30 | (2006.01) |
| G06F 3/0481 | (2013.01) |
| G06F 3/0482 | (2013.01) |
| H04N 5/445 | (2011.01) |
| G06F 3/0487 | (2013.01) |

(52) U.S. Cl.
CPC .... *H04M 1/72561* (2013.01); *G06F 17/30884* (2013.01); *G06F 3/0481* (2013.01); *G06F 3/0482* (2013.01); *G06F 3/0487* (2013.01); *G06F 17/30864* (2013.01); *G06F 17/30876* (2013.01); *G06F 17/30899* (2013.01); *G06F 17/30905* (2013.01); *H04N 5/44543* (2013.01)

(58) Field of Classification Search
CPC .. G06F 3/0481; G06F 3/4082; G06F 3/04817; G06F 9/4443; G06F 5/44543; G06F 17/30876; G06F 8/34; G06F 2/36; G06F 17/30905; G06F 17/30884; G06F 17/30864; G06F 17/30899; H04M 1/72561
USPC 715/762–863, 203; 345/619–629; 707/104.1
See application file for complete search history.

(56) References Cited

U.S. PATENT DOCUMENTS

| | | | |
|---|---|---|---|
| 2003/0233425 A1* | 12/2003 | Lyons et al. ................ | 709/217 |
| 2007/0106953 A1* | 5/2007 | Forstall et al. ............. | 715/779 |
| 2007/0256003 A1 | 11/2007 | Wagoner et al. | |
| 2008/0010286 A1* | 1/2008 | Zhang et al. ................ | 707/10 |
| 2008/0254778 A1* | 10/2008 | Kim .................... | G06F 3/0482 |
| | | | 455/414.3 |

(Continued)

FOREIGN PATENT DOCUMENTS

| | | |
|---|---|---|
| CN | 1507211 A | 6/2004 |
| CN | 1564619 A | 1/2005 |

(Continued)

OTHER PUBLICATIONS

Liu et al., "Favicon Seeded Web Surfing" p. 1—no date.*

(Continued)

*Primary Examiner* — Quoc A Tran
(74) *Attorney, Agent, or Firm* — Jefferson IP Law, LLP

(57) ABSTRACT

An apparatus and a method for providing a bookmark service in a communication terminal are provided. The method includes accessing a website, determining whether a favicon exists in the accessed website, and when the favicon exists in the website, setting the favicon as a bookmark of the website.

17 Claims, 19 Drawing Sheets

(56) References Cited

U.S. PATENT DOCUMENTS

| | | | |
|---|---|---|---|
| 2009/0178007 A1* | 7/2009 | Matas et al. | 715/835 |
| 2009/0249179 A1* | 10/2009 | Shieh | G06F 17/30884 715/206 |
| 2009/0313579 A1* | 12/2009 | Poulson | 715/809 |
| 2010/0115431 A1* | 5/2010 | Holte | 715/760 |
| 2010/0146449 A1* | 6/2010 | Brown et al. | 715/835 |
| 2010/0162168 A1* | 6/2010 | Lee et al. | 715/821 |
| 2010/0262645 A1* | 10/2010 | Brown et al. | 709/203 |
| 2011/0208582 A1* | 8/2011 | Hoyle | 705/14.49 |
| 2011/0231790 A1* | 9/2011 | Forstall et al. | 715/779 |
| 2011/0252307 A1* | 10/2011 | Williamson et al. | 715/234 |

FOREIGN PATENT DOCUMENTS

| | | |
|---|---|---|
| CN | 101452489 A | 6/2009 |
| JP | 2006-155558 A | 6/2006 |
| JP | 2007-003972 A | 1/2007 |
| KR | 10-0757658 B1 | 9/2007 |
| KR | 10-2008-0108710 A | 12/2008 |

OTHER PUBLICATIONS

Choi, Bong Joon, A Study on Detection Technique of Bookmarking(Favorites) using Favicon in Web Browser, the 5th International Conference on Internet Computing (IC 2004), Jun. 2004, pp. 1-7.

* cited by examiner

FIG.10A
```
<link rel="shortcut icon" href=" ">
<HEAD>
   <LINK REL="SHORTCUT ICON" HREF="http://morfik.homeip.com/favicon.ico">
   <TITLE>My Title</TITLE>
</HEAD>
```
FIG.10B
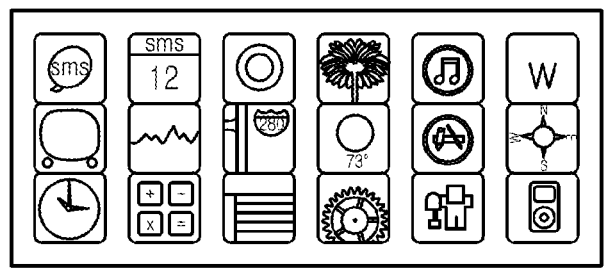
FIG.10C

PERFORM PRIMARY EDIT PROCESSING

PERFORM PRIMARY AND SECONDARY EDIT PROCESSINGS

APPARATUS AND METHOD FOR PROVIDING BOOKMARK SERVICE IN COMMUNICATION TERMINAL

PRIORITY

This application claims the benefit under 35 U.S.C. §119(a) of a Korean patent application filed in the Korean Intellectual Property Office on Dec. 11, 2009 and assigned Serial No. 2009-0122919, the entire disclosure of which is hereby incorporated by reference.

BACKGROUND OF THE INVENTION

1. Field of the Invention

The present invention relates to a communication terminal. More particularly, the present invention relates to an apparatus and a method for providing a bookmark service in a communication terminal.

2. Description of the Related Art

Recently, as an electronic communication technology rapidly develops, applications of a wired communication network and a wireless communication network gradually expand. For example, a Personal Digital Assistant (PDA) and a mobile phone as well as a computer provide an Internet access function via a wired line or wirelessly.

A terminal that provides an Internet access function (referred to as a 'communication terminal' hereinafter) provides various techniques for facilitating a user's access to a desired website. For example, the communication terminal provides techniques for accessing a desired website using a bookmark, Uniform Resource Locator (URL) input, a home page, a background screen, a visual bookmark, etc.

FIG. 1 is a view illustrating a bookmark using technique in the conventional communication terminal.

Referring to FIG. 1, the technique that uses the bookmark allows a user to register an address of a desired website in advance in the communication terminal, and immediately access the desired website via the registered address. The technique that uses the bookmark has an advantage of classifying websites for each folder according to a characteristic of a website, but has a disadvantage that it is not intuitive, because a relevant website is represented using an address or a simple description.

FIG. 2 is a view illustrating an URL input technique in the conventional communication terminal.

Referring to FIG. 2, the URL input technique allows a user to input a URL of a desired website into an input window directly. In this technique, a user may access a website whose URL is known directly, but there is inconvenience of having to input the URL case by case via an input unit such as a keypad, a keyboard, and a touchpad.

FIG. 3 is a view illustrating a home page using technique in the conventional communication terminal.

Referring to FIG. 3, the technique that uses the home page allows a user to register a specific website as a home page at a communication terminal, and then access the website set as the home page when entering a web browser. Since the technique that uses the home page accesses the home page without performing a separate operation upon entrance of the web browser, the user may access the home page within a shortest time, but in the case where the user does not desire to access the website designated as the home page, the user ends up paying unnecessary traffic costs navigating to the home page automatically and then navigating to the desired page.

FIG. 4 is a view illustrating a background screen using technique in the conventional communication terminal.

Referring to FIG. 4, the technique that uses a background screen allows a user to access a website via an icon provided on a background screen of the communication terminal. In this technique, access to a website is easy but an icon representing the website is fixed, so that a characteristic of the website cannot be represented or is difficult to change according to a user's taste.

FIG. 5 is a view illustrating a visual bookmark using technique in the conventional communication terminal.

Referring to FIG. 5, the visual bookmark technique allows a user to access a desired website using a bookmark showing the website in advance. This technique has an excellent visual effect. However, in case of a website having a small logo, the user cannot easily discriminate the relevant logo and so readability declines. Since a screen of the website should be captured and stored in advance, a problem may occur in aspects of a memory and performance of the communication terminal. In addition, due to a speed of loading a screen and a readability problem, the number of websites that may be shown on one screen is small.

As described above, the website access techniques provided by the conventional communication terminal have disadvantages in aspects of readability, website access easiness, and performance of a communication terminal. Therefore, a technique for meeting users' various desires and facilitating an access to a desired website while minimizing the above disadvantages is desired.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for providing a bookmark service in a communication terminal.

Another aspect of the present invention is to provide an apparatus and a method for setting a favicon provided for each website as a bookmark in a communication terminal.

Another aspect of the present invention is to provide an apparatus and a method for displaying website access information via a bookmark in a communication terminal.

Another aspect of the present invention is to provide an apparatus and a method for giving an image effect to a bookmark in a communication terminal.

In accordance with an aspect of the present invention, a method for providing a bookmark service in a communication terminal is provided. The method includes accessing a website, determining whether a favicon exists in the accessed website, and when the favicon exists in the website, setting the relevant favicon as a bookmark of the website.

In accordance with another aspect of the present invention, an apparatus for providing a bookmark service in a communication terminal is provided. The apparatus includes a controller for, when a website is accessed, determining whether a favicon exists in the accessed website, and when the favicon exists in the website, setting the relevant favicon as a bookmark of the website.

In accordance with another aspect of the present invention, a communication terminal is provided. The communication terminal includes a communication unit for communicating with a web server, a controller including a bookmark manager for determining whether a favicon is present in a website accessed via the communication unit and for setting the favicon as a bookmark for the website, and a display unit for displaying a user interface including the bookmark.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 10A to 10C are views illustrating a screen of obtaining a favicon from a website in a communication terminal according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
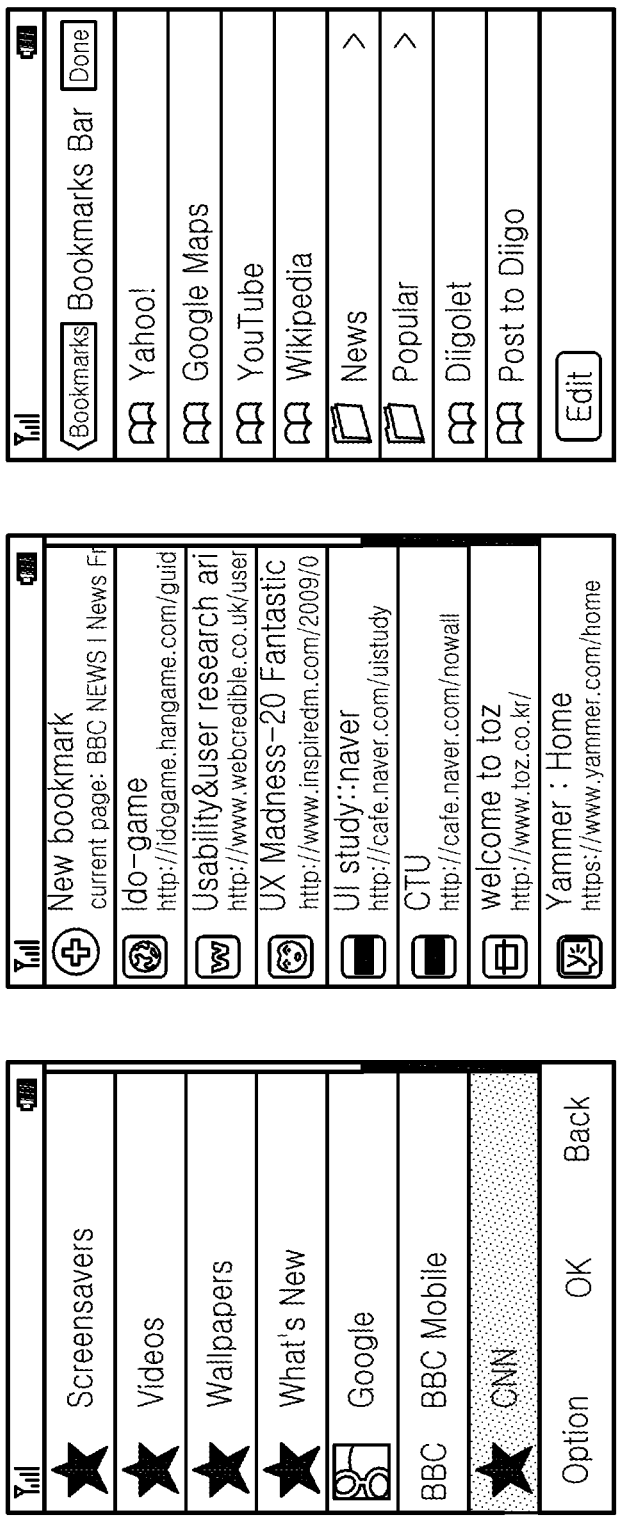
FIG. 1 is a view illustrating a bookmark using technique in the conventional communication terminal.
Figure 2:
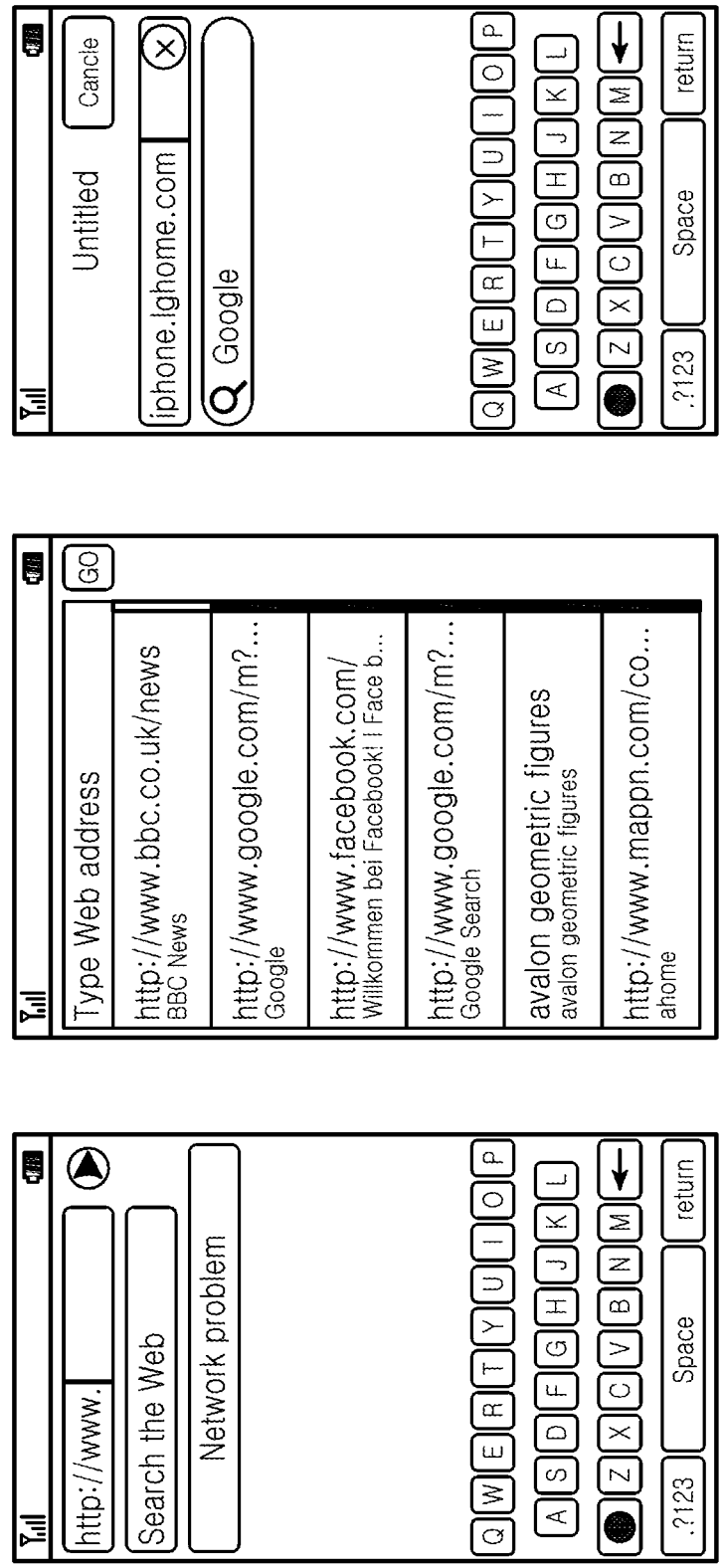
FIG. 2 is a view illustrating an URL input technique in the conventional communication terminal.
Figure 3:
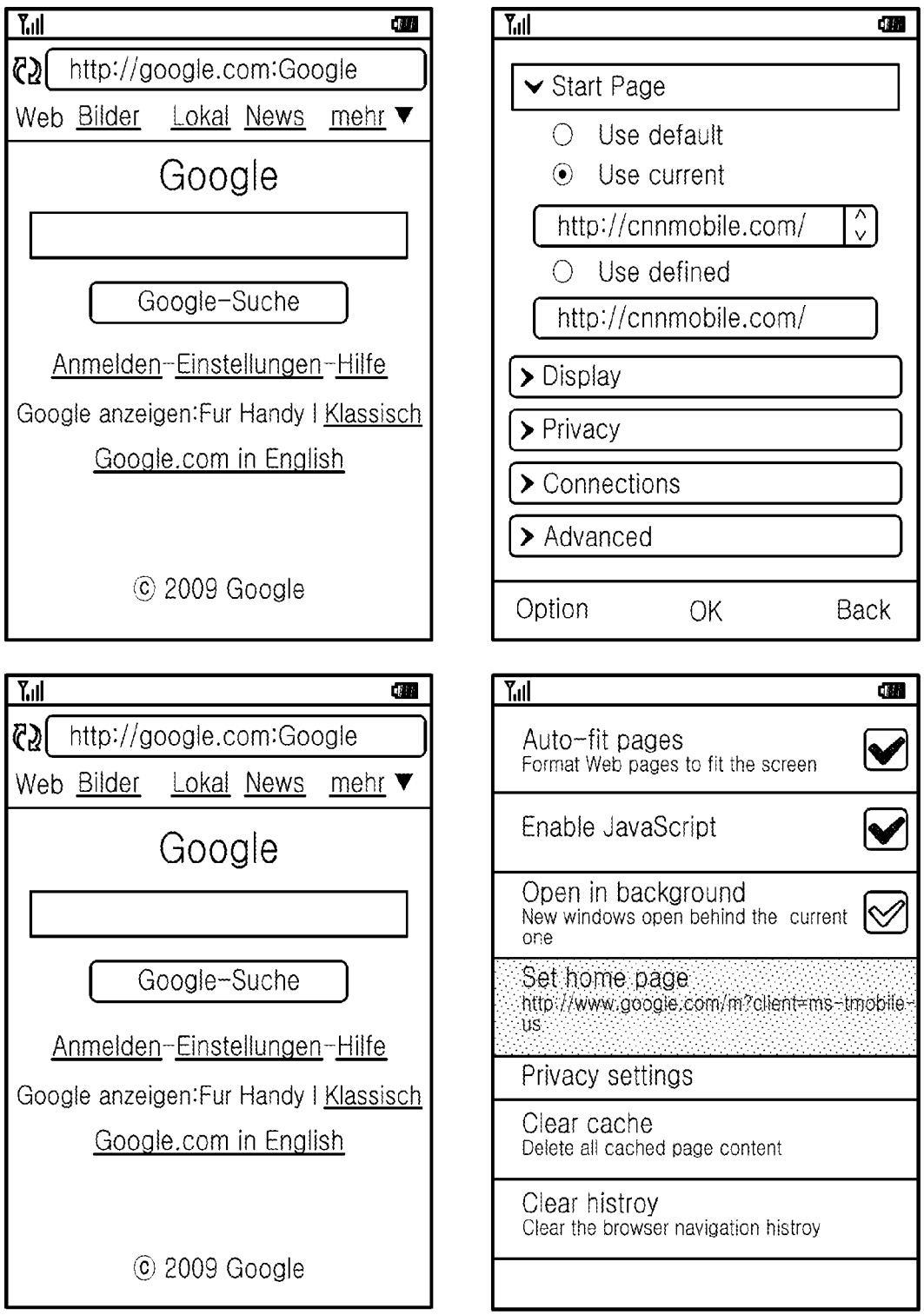
FIG. 3 is a view illustrating a home page using technique in the conventional communication terminal.
Figure 4:
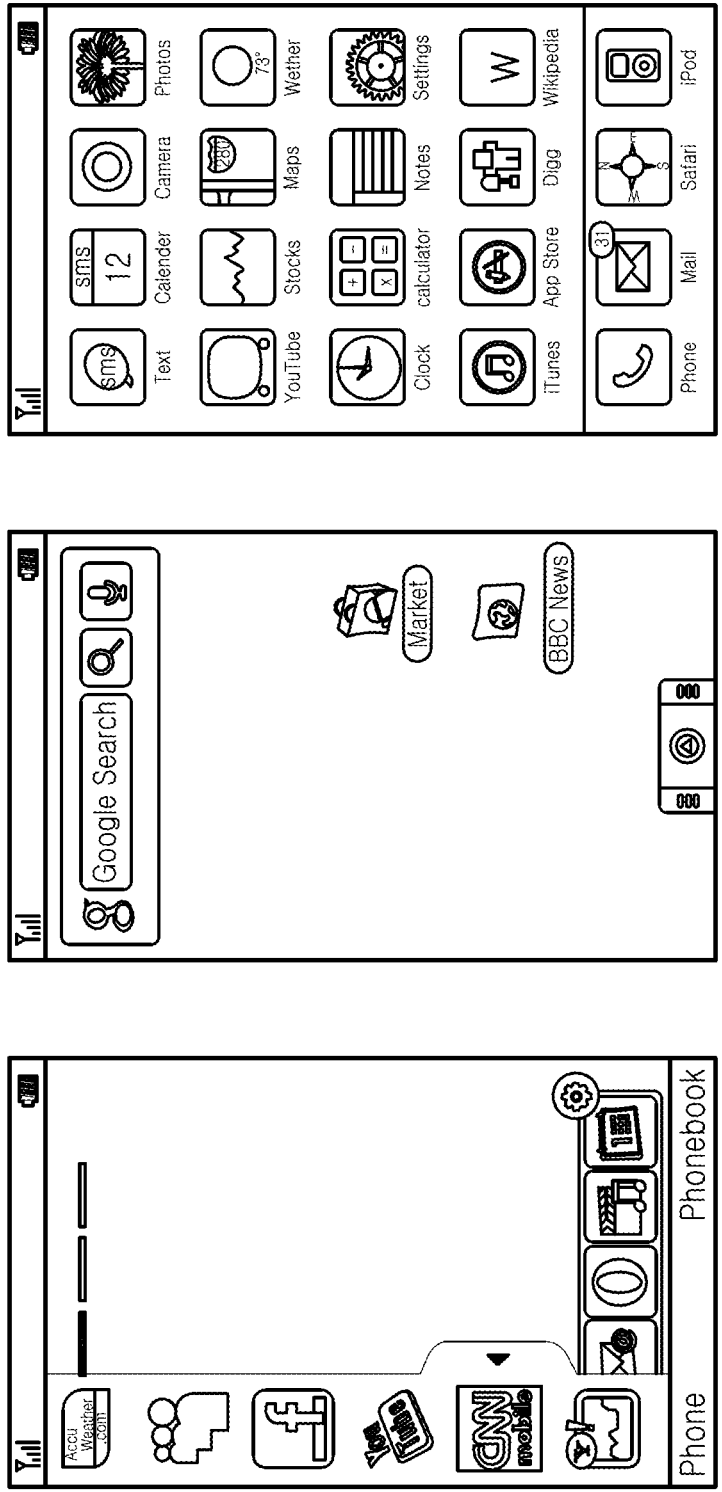
FIG. 4 is a view illustrating a background screen using technique in the conventional communication terminal.
Figure 5:
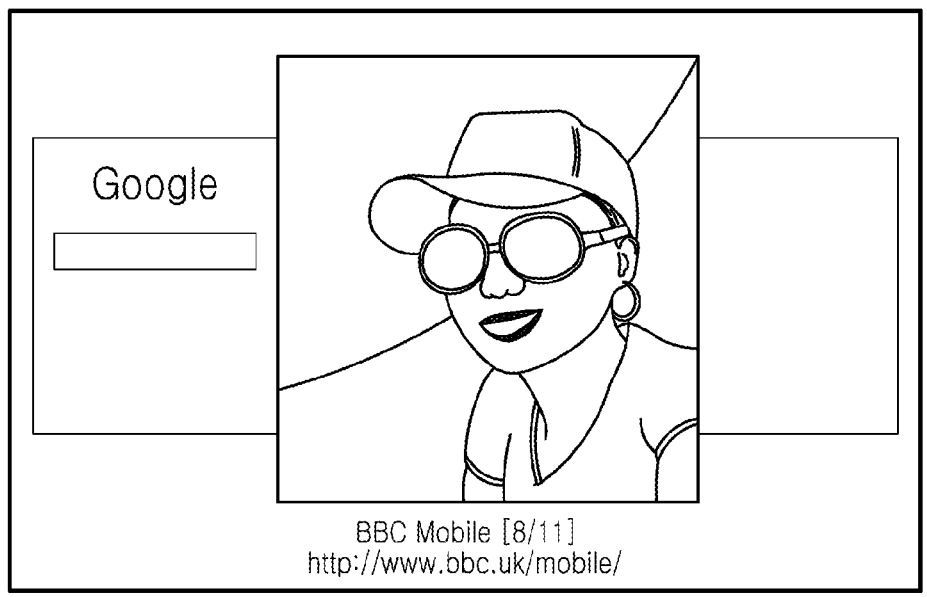
FIG. 5 is a view illustrating a visual bookmark using technique in the conventional communication terminal.
Figure 5:
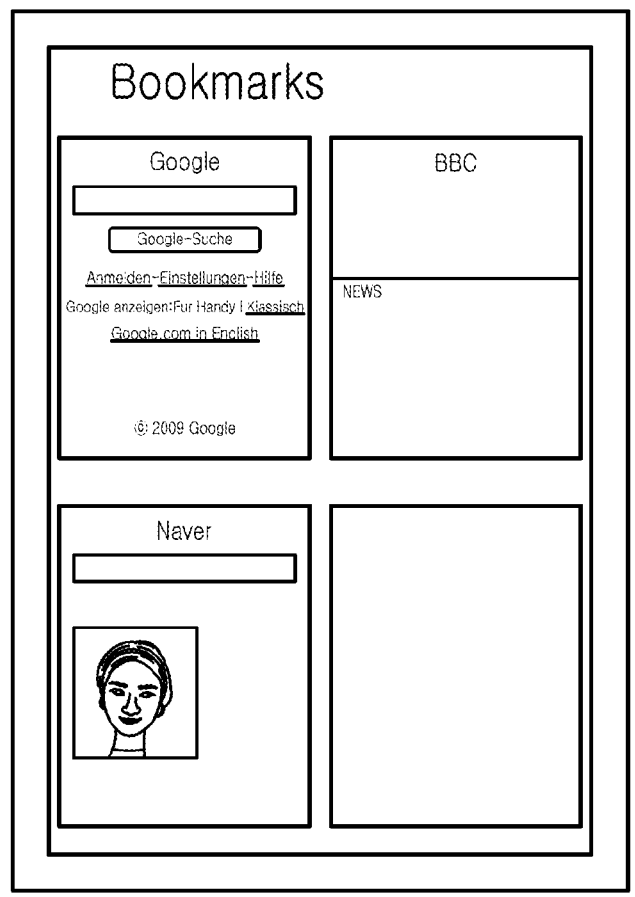
Figure 6:
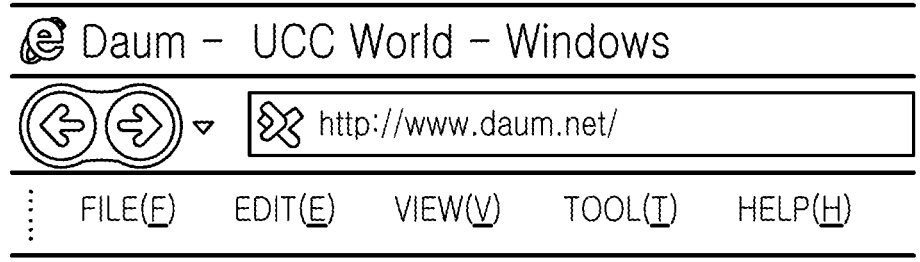
FIG. 6 is a view illustrating a website screen that provides a favicon according to a web international standard.

Exemplary embodiments of the present invention provide a technique for setting a favicon provided for each website as a bookmark, giving an image effect to the bookmark, and displaying website access information via the bookmark in a communication terminal. The favicon denotes an icon representing a website, and may be provided as an .ico file (hereinafter ico format). As illustrated in FIG. 6, most websites provide meta data including a favicon according to a web international standard.

Figure 7:
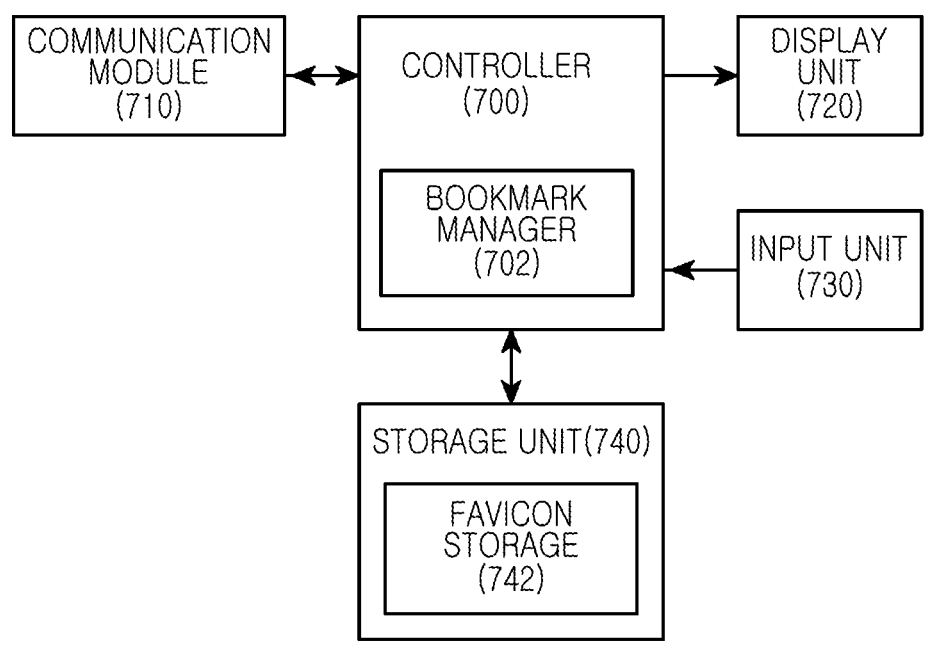
FIG. 7 is a block diagram illustrating a communication terminal according to an exemplary embodiment of the present invention.

FIG. 7 is a block diagram illustrating a communication terminal according to an exemplary embodiment of the present invention.

Referring to FIG. 7, the communication terminal includes a controller 700, a communication module 710, a display unit 720, an input unit 730, and a storage unit 740. The controller 700 includes a bookmark manager 702. The storage unit 740 includes a favicon storage 742. The communication terminal may also include additional units. Similarly, the functionality of two or more of the above units may be integrated into a single component.

The controller 700 performs control and processes for overall operations of the communication terminal. The controller 700 sets a favicon provided for each website as a bookmark, gives an image effect to the bookmark, and displays website access information via the bookmark by including the bookmark manager 702.

When a website access event occurs, the bookmark manager 702 controls the communication module 710 to obtain meta data from a relevant website, obtains a favicon from the meta data, sets the obtained favicon as a bookmark of the website, and stores the favicon in the storage unit 740. The meta data includes a URL, a favicon, and other Hyper Text Markup Language (HTML) field information of the website. Generally, since the favicon is located at a root of a server or, in other cases, a location of the favicon is specified in an HTML document, the bookmark manager 702 may obtain the favicon from a root directory of the server or from the location specified in the HTML document.

FIGS. 10A to 10C are views illustrating a screen of obtaining a favicon from a website in a communication terminal according to an exemplary embodiment of the present invention.

Referring to FIGS. 10A-C, when a specific website is accessed as in FIG. 10A, the bookmark manager 702 determines a location of a favicon from an HTML document as in FIG. 10B and obtains the favicon from the location, and stores the favicon for each website as illustrated in FIG. 10C. Where the obtained favicon has an ico format, the bookmark manager 702 analyzes the favicon of the ico format to extract only one image, and sets the extracted image as a bookmark.

Figure 11:
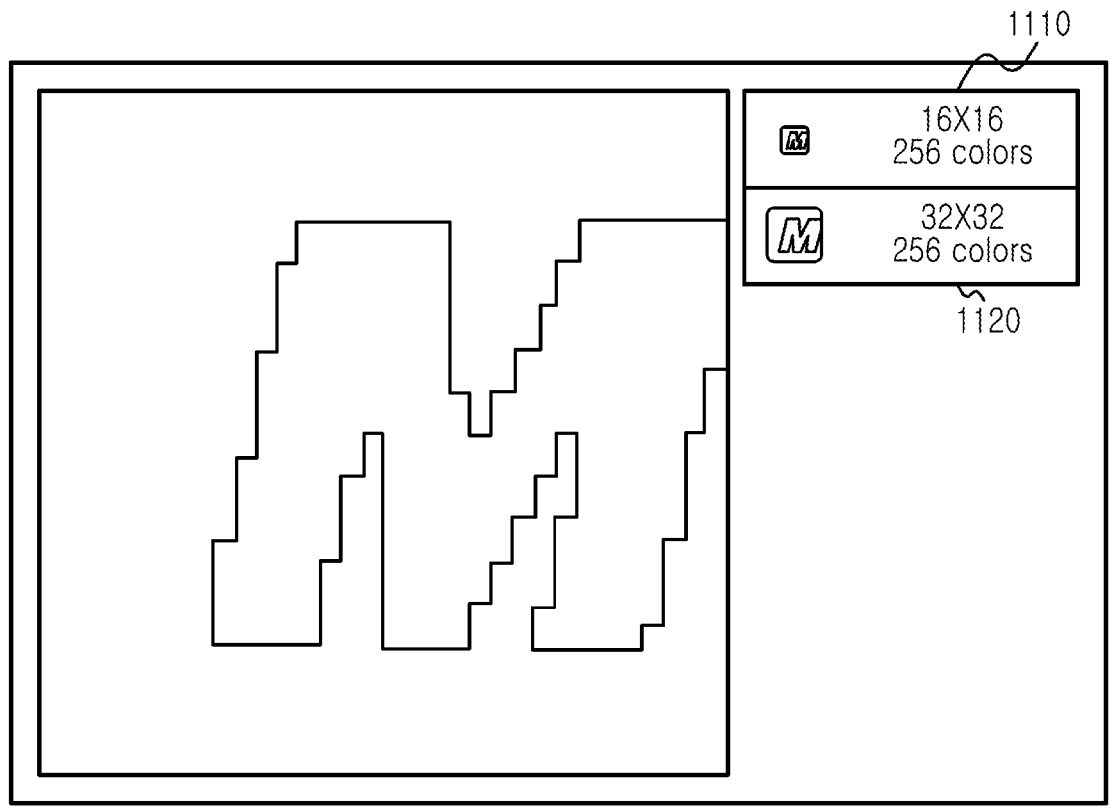
FIG. 11 is a view illustrating a screen of obtaining a favicon from an ICO format file in a communication terminal according to an exemplary embodiment of the present invention.

FIG. 11 is a view illustrating a screen of obtaining a favicon from an ICO format file in a communication terminal according to an exemplary embodiment of the present invention.

Referring to FIG. 11, since the ico format may include images 1110 and 1120 having different sizes and color values within one file, the bookmark manager 702 selects one image from the different images 1110 and 1120 and sets the selected one image as a bookmark. For example, the bookmark manager 702 may determine the image 1120 having a largest size and a highest color value as a bookmark. When a favicon does not exist in a relevant website, the bookmark manager 702 may determine a favicon image using icons stored in advance in the storage unit 740.

The bookmark manager 702 may also perform vectorization on the favicon and apply an image effect to the favicon. This is for preventing the favicon from being broken down when the favicon is magnified using an effect of controlling the favicon to a desired size while maintaining resolution by converting the favicon into a vector format. In addition, the bookmark manager 702 may smooth-process the favicon.

Figure 12:
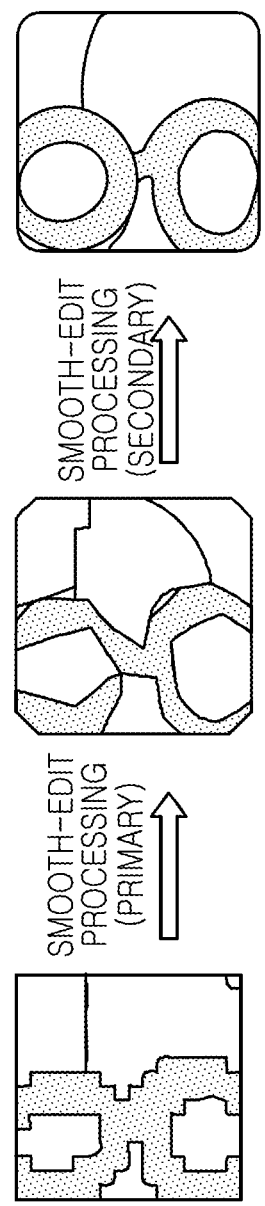
FIG. 12 is a view illustrating a screen of processing a favicon image smoothly in a communication terminal according to an exemplary embodiment of the present invention.
Figure 13:
FIG. 13 is a view illustrating a bookmark display screen that applies image planarization in a communication terminal according to an exemplary embodiment of the present invention.
Figure 13:
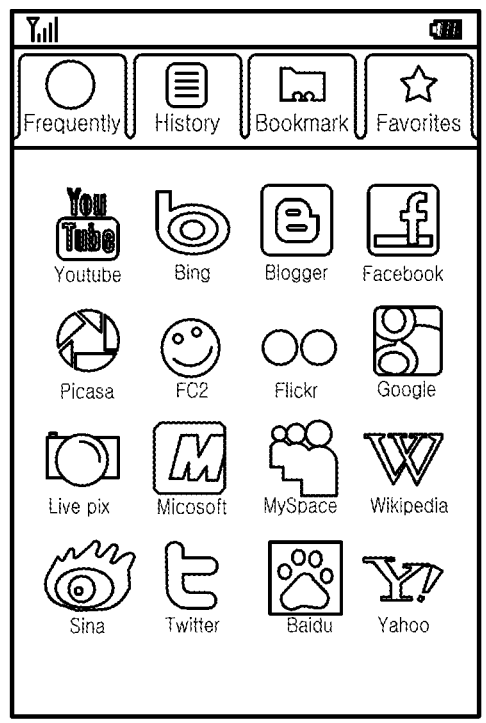

FIG. 12 is a view illustrating a screen of processing a favicon image smoothly in a communication terminal according to an exemplary embodiment of the present invention, and FIG. 13 is a view illustrating a bookmark display screen that applies image planarization in a communication terminal according to an exemplary embodiment of the present invention.

Referring to FIGS. 12 and 13, since a favicon having a small number of pixels may not be expressed smoothly during magnification even when the vectorization is performed, a smooth-process may be performed as illustrated in FIG. 12. The bookmark manager 702 may also perform a primary smooth process on the favicon and perform both primary and secondary smooth processes on the favicon depending on a circumstance and setting as illustrated in FIG. 13.

Figure 14:
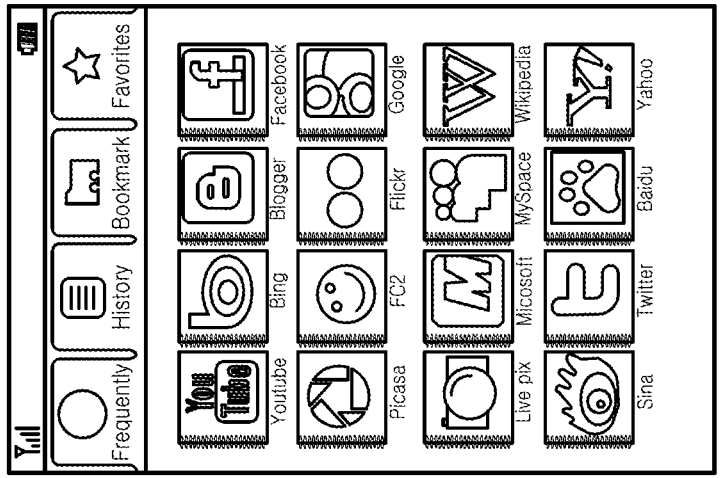
FIG. 14 is a view illustrating a screen of giving an image effect to a bookmark in a communication terminal according to an exemplary embodiment of the present invention.
Figure 14:
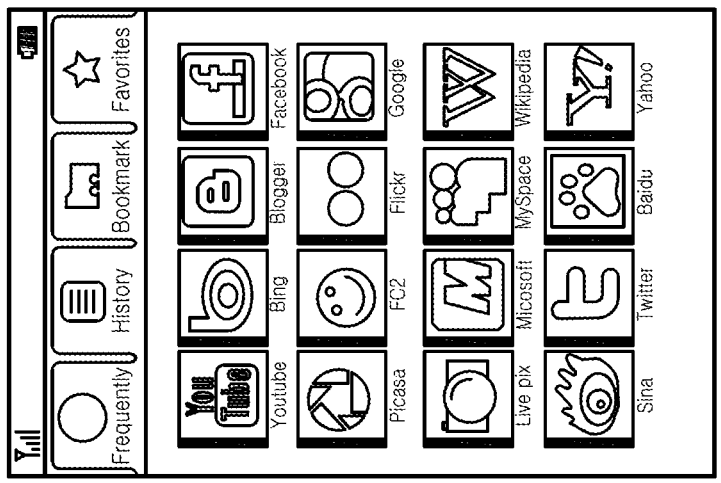
Figure 14:
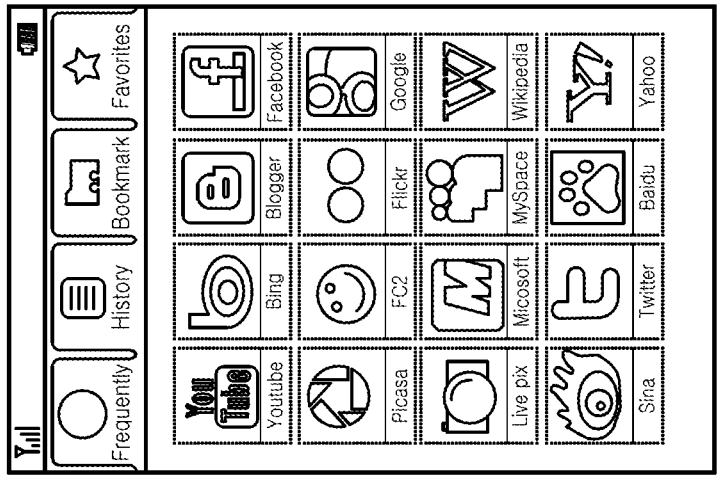

FIG. 14 is a view illustrating a screen of giving an image effect to a bookmark in a communication terminal according to an exemplary embodiment of the present invention.

Referring to FIG. 14, the bookmark manager 702 may apply a different image effect to the favicon. The image effect includes not only the smooth-process but also all effects provided during general image editing, for example, rotation, color control, brightness control, size control, a shadow effect, a frame addition, etc. For example, the bookmark manager 702 may add a frame of a stamp style, a CD case style, or a book style to the favicon as illustrated in FIG. 14.

In addition, the bookmark manager 702 controls the communication module 710 when accessing the website to measure information regarding a website access, for example, a URL, a last access time, a time taken for an access (loading time), a loading speed, and loading data, and then mapping the measured information regarding the website access to a favicon, that is, a bookmark of the accessed website, and storing the measured information regarding the website access.

Figure 15:
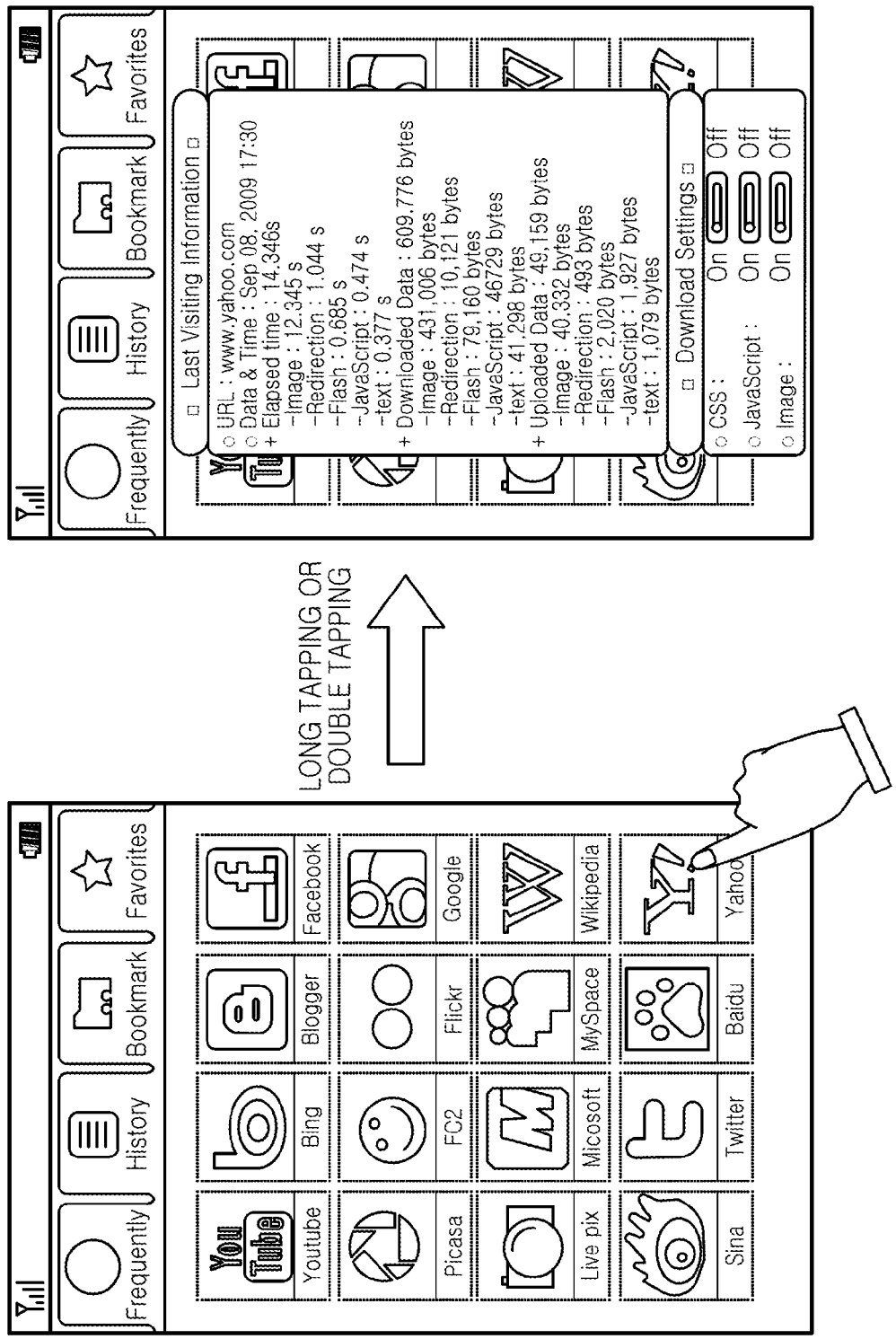
FIG. 15 is a view illustrating a screen of displaying website access information via a bookmark in a communication terminal according to an exemplary embodiment of the present invention.

FIG. 15 is a view illustrating a screen of displaying website access information via a bookmark in a communication terminal according to an exemplary embodiment of the present invention.

Referring to FIG. 15, when displaying a bookmark, the bookmark manager 702 controls the display of access information mapped to a specific bookmark according to a user operation. For example, as illustrated in FIG. 15, when a user lightly taps a specific bookmark among a plurality of displayed bookmarks, or taps the specific bookmark for more than a predetermined time, or doubly taps the specific bookmark, the bookmark manager 702 controls the display of the website access information mapped to the specific bookmark via a popup window. The bookmark manager 702 may set a configuration regarding a kind of data to be loaded during an access to a relevant website via the popup window. For example, as illustrated in FIG. 15, the bookmark manager 702 may set whether to load a Cascading Style Sheet (CSS), JavaScript, an image, etc. Of course, the access information displayed via the popup window may be deleted or added by a company or a user.

Figure 16:
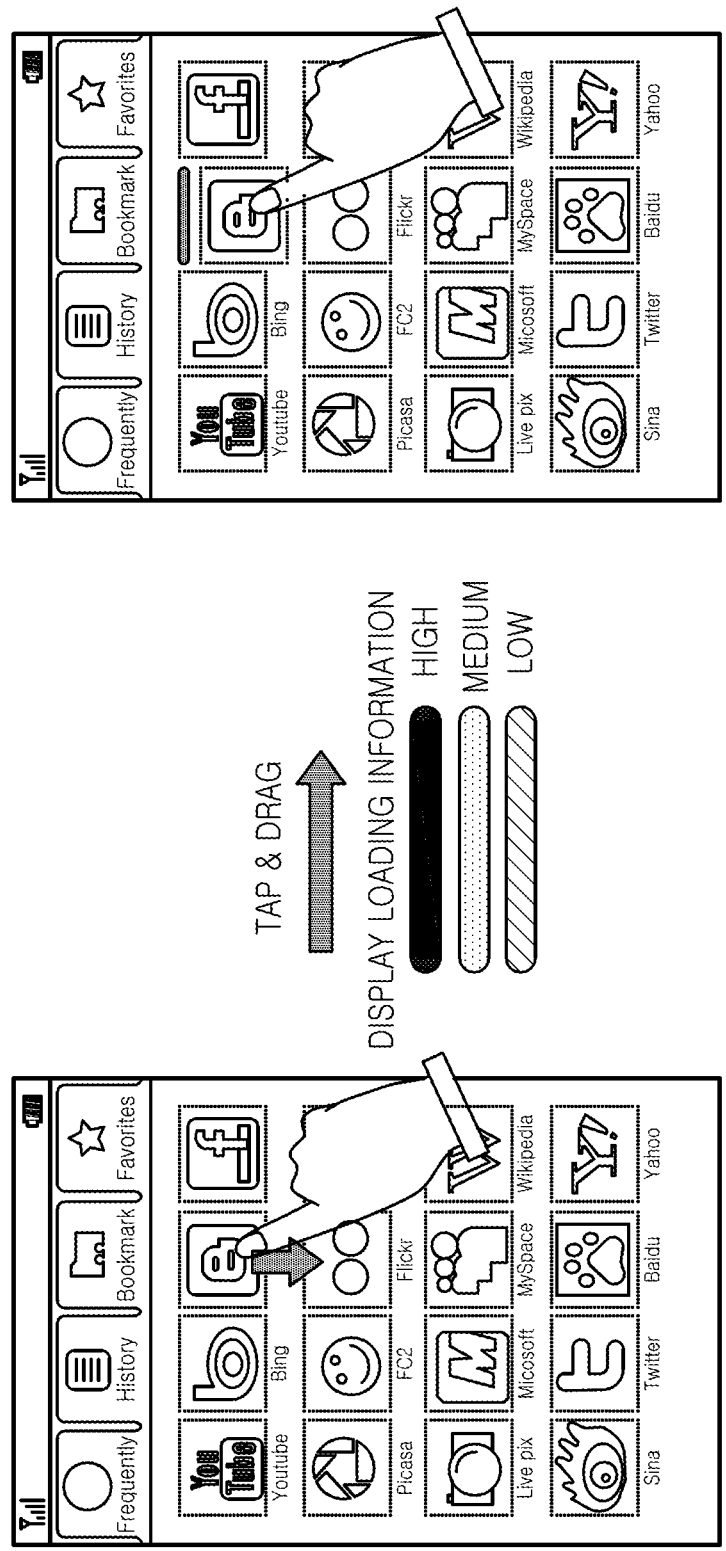
FIG. 16 is a view illustrating a screen of displaying website loading information via a bookmark in a communication terminal according to an exemplary embodiment of the present invention.
Figure 17A:
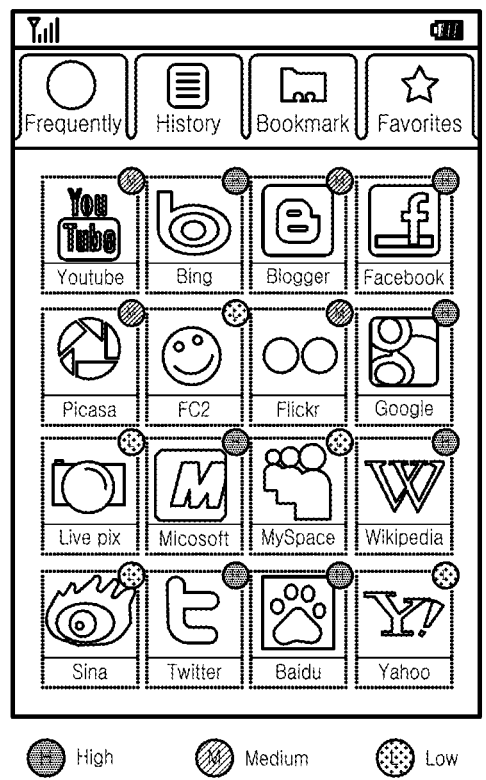
FIGS. 17A to 17C are views illustrating various methods for displaying website loading information via a bookmark in a communication terminal according to an exemplary embodiment of the present invention.
Figure 17B:
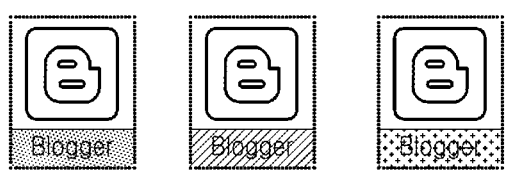
Figure 17C:
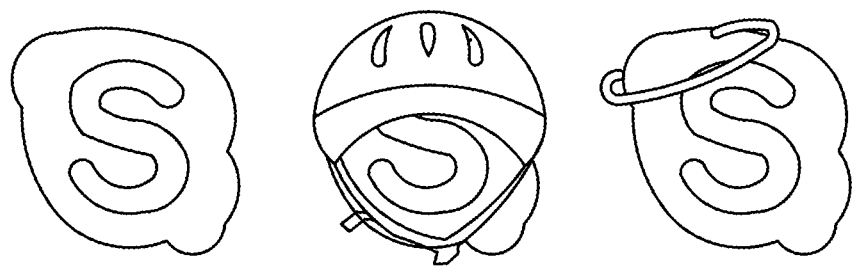

FIG. 16 is a view illustrating a screen of displaying website loading information via a bookmark in a communication terminal according to an exemplary embodiment of the present invention, and FIGS. 17A to 17C are views illustrating various methods for displaying website loading information via a bookmark in a communication terminal according to an exemplary embodiment of the present invention.

Referring to FIGS. 16 and 17A-17C, the bookmark manager 702 may control the display of information representing a loading time at the upper end of a relevant bookmark as illustrated in FIG. 16 without opening a popup window. In addition, as illustrated in FIGS. 17A-17C, the bookmark manager 702 may display loading time information for each bookmark when displaying a bookmark.

When an event for controlling a screen display ratio occurs, such as a screen magnify or reduce event, the bookmark manager 702 controls a function for magnifying or reducing a screen including the bookmark. When the screen display ratio is more than a threshold, the bookmark manager 702 controls the display of an image of a website corresponding to the bookmark instead of a favicon set as the bookmark.

Figure 18:
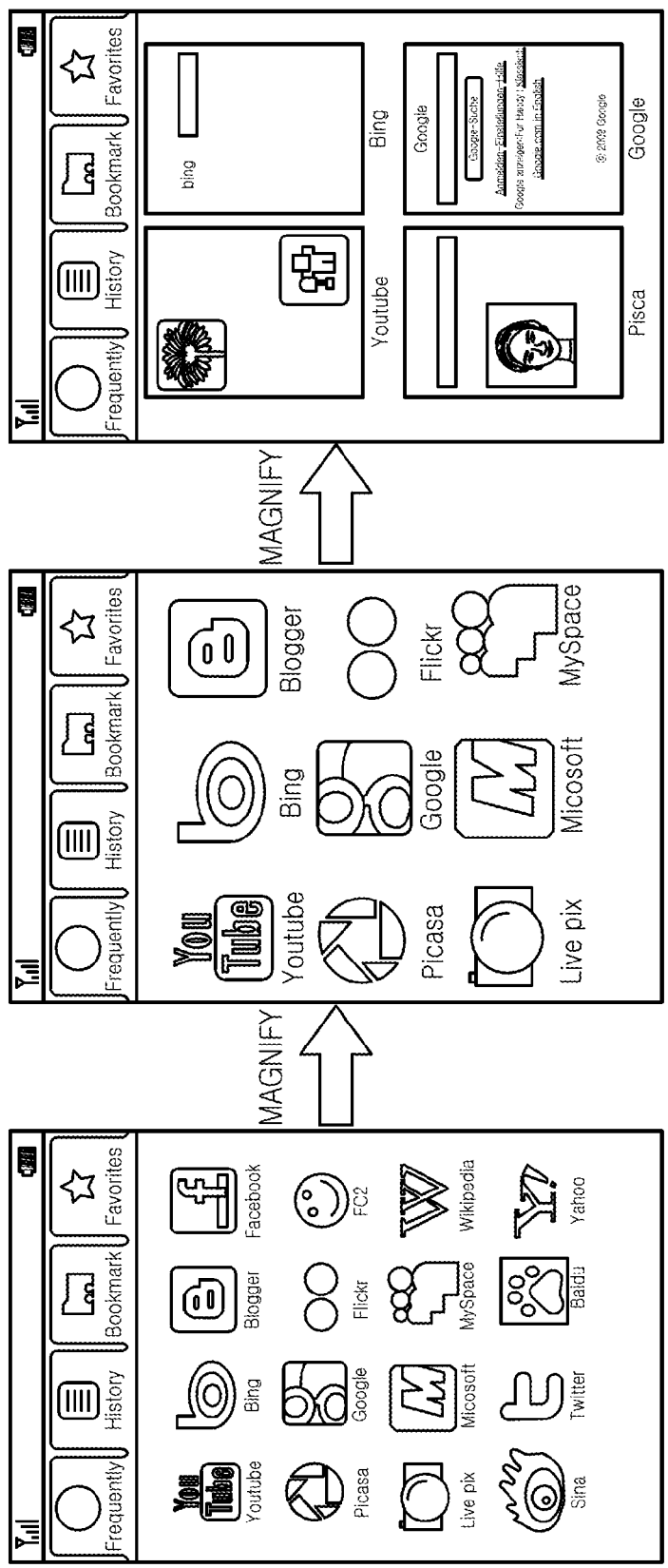
FIG. 18 is a view illustrating bookmark magnifying/reducing methods in a communication terminal according to an exemplary embodiment of the present invention.

FIG. 18 is a view illustrating bookmark magnifying/reducing methods in a communication terminal according to an exemplary embodiment of the present invention.

Referring to FIG. 18, the image of the website may be an image obtained in advance during an access to the relevant website. For example, as illustrated in FIG. 18, when a screen magnify event occurs, the bookmark manager 702 magnifies the screen including a bookmark according to the magnify degree. When the magnify degree reaches a threshold, the bookmark manager 702 displays and magnifies a screen including the image of the website instead of the bookmark. When the screen including the image of the website is magnified continuously and reaches a maximum threshold, the bookmark manager 702 may access a website whose displayed portion is largest on the screen.

The bookmark manager 702 may also designate a website according to a user's setting, and controls to display the website using a website image, not a favicon and display the rest of websites using a favicon set as a bookmark as illustrated in FIG. 17.

The communication module 710 performs functions for accessing a website in a wired line or wirelessly and processing signals transmitted/received to/from the accessed website under control of the controller 700. The display unit 720 displays status information, numbers, letters, still images, and moving images generated during an operation of the communication terminal, and displays website access information corresponding to favicons set as bookmarks under control of the controller 700. The input unit 730 includes at least one input key and a touch sensor to provide data corresponding to a key pressed or a location touched by a user to the controller 700.

The storage unit 740 stores various programs for an overall operation of the communication terminal, and data, and includes the favicon storage 742 to store a favicon for each website under control of the controller 700. In addition, the favicon storage 742 maps meta data obtained from each website and access information obtained during a last access to each website to the favicon and stores the meta data and access information under control of the controller 700. The access information includes at least one of a URL, a last access time, a time taken for an access (loading time), a loading speed, loading data, and a website image.

Figure 8:
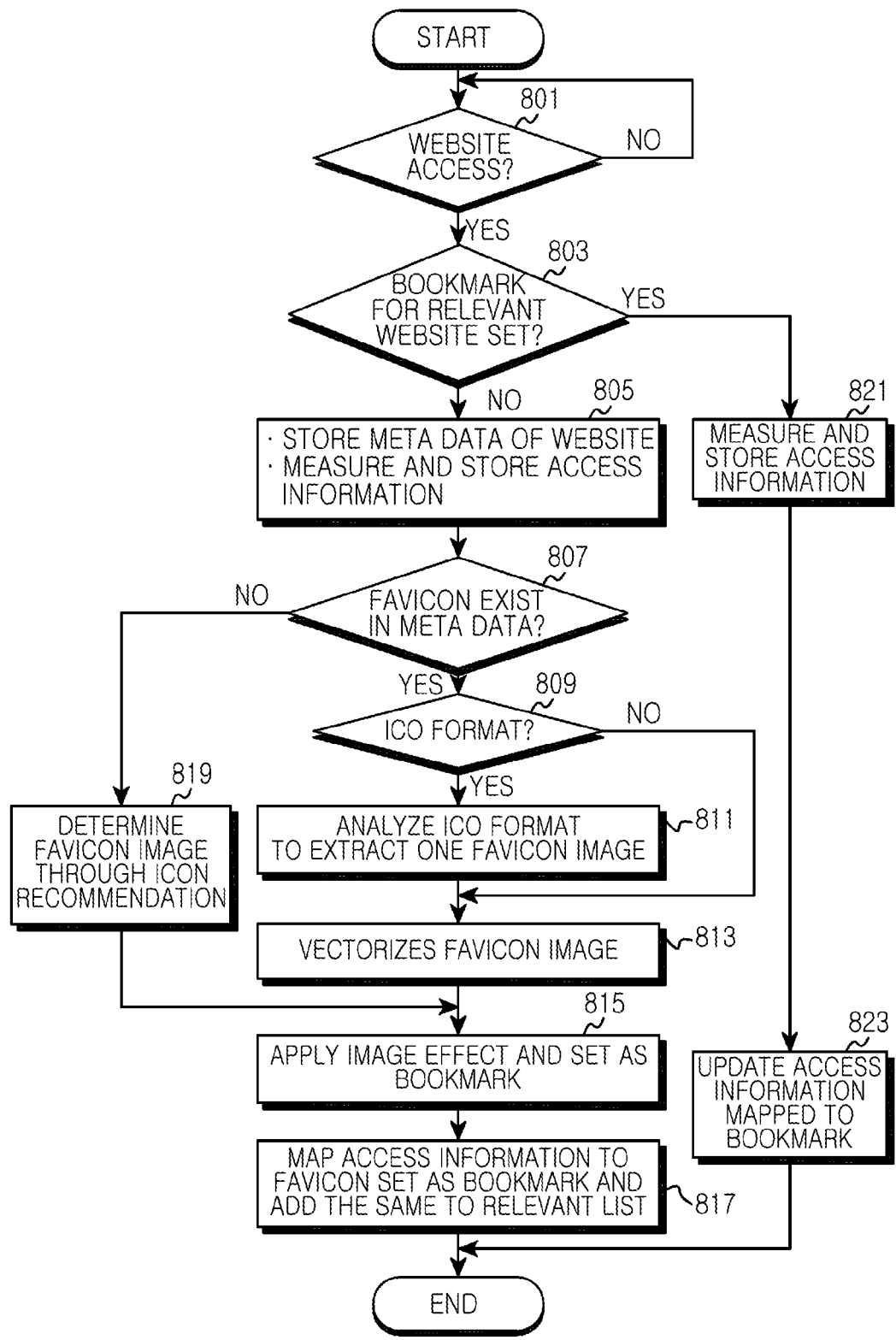
FIG. 8 is a flowchart illustrating an operation procedure for setting a bookmark in a communication terminal according to an exemplary embodiment of the present invention.

FIG. 8 is a flowchart illustrating an operation procedure for setting a bookmark in a communication terminal according to an exemplary embodiment of the present invention.

Referring to FIG. 8, the communication terminal detects whether it is connected to a website in step 801. The website may be connected using a bookmark set in advance or by inputting a URL. When the website is connected, the communication terminal determines whether a bookmark for the relevant website is set in step 803.

When the bookmark for the website is not set, (such as when the communication terminal accesses the website for the first time), the communication terminal obtains and stores meta data from the website, and measures and stores website access information in step 805. The meta data includes a URL, a favicon, and other HTML field information of the website. The website access information includes a URL, a last access time, a time taken for an access (loading time), a loading speed, loading data, and a website image.

The communication terminal determines whether a favicon for the relevant website exists in the obtained meta data in step 807. When the favicon exists, the communication terminal determines whether the favicon has an ico format in step 809. When the favicon does not have an ico format, for example, when the favicon has a jpg, png, or gif format, the communication terminal proceeds to step 813 without performing step 811. Alternatively, the communication terminal may convert the favicon into the ico format.

When the favicon has an ico format, the communication terminal analyzes the favicon having the ico format to extract only one image in step 811. Since a file of an ico format may include images 1110 and 1120 having different sizes and color values within one file as illustrated in FIG. 11, the communication terminal extracts one image from the different images 1110 and 1120 included in the favicon of the ico format when the favicon has the ico format. For example, the communication terminal may extract the image 1120 having a largest size and a highest color value.

The communication terminal vectorizes a favicon image in step 813. The communication terminal vectorizes the favicon image in order to prevent the favicon image from being broken down during magnification of the favicon image.

In contrast, when the favicon for the relevant website does not exist in the meta data as a result of the determination in step 807, the communication terminal recommends an icon stored in advance to determine a favicon image in step 819. For example, the communication terminal displays icons stored in advance on a screen, allows a user to select one icon, and determines to use the selected icon as a favicon image of the relevant website. In addition, the communication terminal may determine to use a predetermined basic icon as a favicon image of the relevant website without passing through the user selection process.

The communication terminal applies an image effect to the favicon, and sets the favicon to which the image effect has been applied as a bookmark of the accessed website in step 815. The image effect includes effects provided during general image editing, such as a smooth-process, rotation, color control, brightness control, size control, a shadow effect, a frame addition, etc. The communication terminal may apply a plurality of image effects to the favicon, and doubly apply the same image effect to the favicon. For example, the communication terminal may doubly perform a smooth-process on the favicon, and perform only a primary smooth-process on the favicon, and perform both primary and secondary smooth-processes on the favicon depending on a circumstance and setting as illustrated in FIG. 12. In addition, the communication terminal may add a frame of a stamp style, a CD case style, or a book style to the favicon on which the primary smooth-process has been performed as illustrated in FIG. 14.

The communication terminal maps access information obtained during the access to the website to the favicon set as the bookmark, stores the information, and adds the bookmark to a relevant list in step 817. The communication terminal adds the bookmark to at least one list of lists including bookmarks for each website. The lists include at least one of a frequency accessed list, a history list, a bookmark list, and a favorite list.

In contrast, when the bookmark for the relevant website is set in step 803 (such as when the communication terminal has accessed the website previously), the communication terminal measures and stores website access information in step 821. The meta data includes a URL, a favicon, and other HTML field information of the website. The website access information includes a URL, a last access time, a time taken for an access (loading time), a loading speed, loading data, and a website image.

In step 823, the communication terminal replaces the access information mapped to the favicon set as the bookmark of the website by the access information obtained in step 821.

Figure 9:
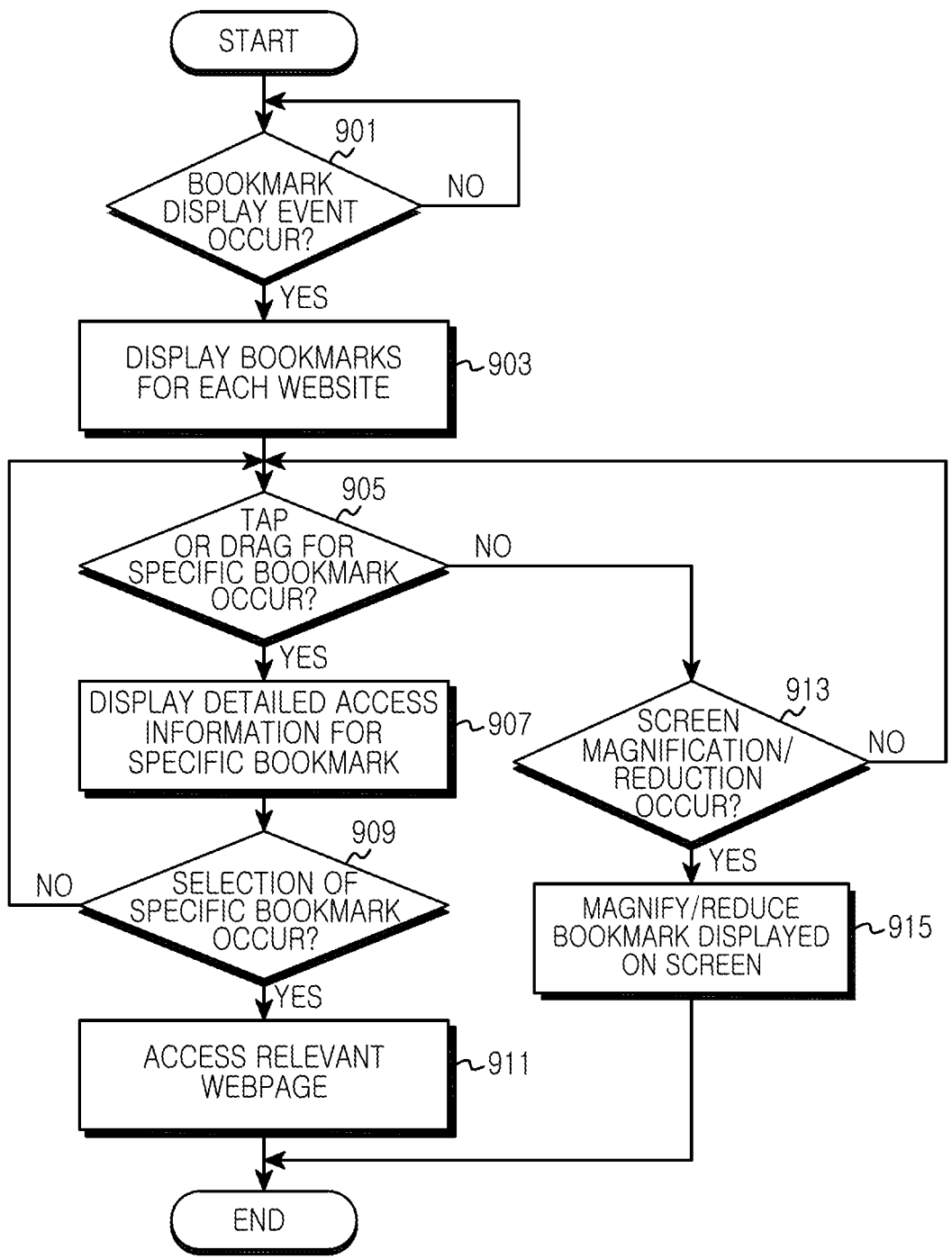
FIG. 9 is a flowchart illustrating an operation procedure for displaying website access information via a bookmark in a communication terminal according to an exemplary embodiment of the present invention.

FIG. 9 is a flowchart illustrating an operation procedure for displaying website access information via a bookmark in a communication terminal according to an exemplary embodiment of the present invention.

Referring to FIG. 9, the communication terminal determines whether a bookmark display event occurs in step 901.

For example, the communication terminal determines whether an event for displaying at least one list from lists including bookmarks for each website occurs. The lists include at least one of a frequency accessed list, a history list, a bookmark list, and a favorite list. Each bookmark included in the list may be moved to a different list using a drag-and-drop operation.

Figure 19:
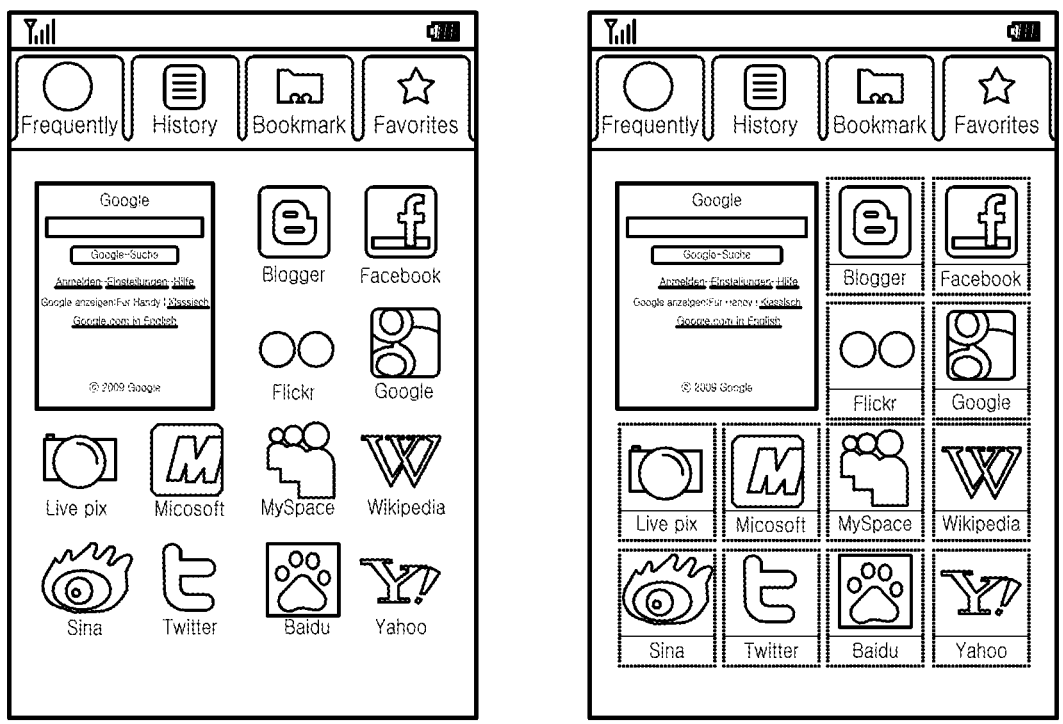
FIG. 19 is a view illustrating a bookmark display method in a communication terminal according to an exemplary embodiment of the present invention.

When the bookmark display event occurs, the communication terminal displays bookmarks for each website included in a relevant list in step 903. The communication terminal may designate a website according to a user setting, and display the website using a website image, not a favicon, and display the rest of websites using favicons set as bookmarks as illustrated in FIG. 19.

The communication terminal determines whether tapping or a drag for a specific bookmark occurs among the displayed bookmarks in step 905. When a tapping or a drag for the specific bookmark occurs, the communication terminal displays detailed access information for the specific bookmark in step 907. For example, as illustrated in FIG. 15, when a user lightly taps a specific bookmark, or taps the specific bookmark for more than a predetermined time, or double-taps the specific bookmark with a plurality of bookmarks displayed, the communication terminal controls to display website access information mapped to the specific bookmark via a popup window.

The communication terminal may set configuration for a kind of data to be loaded when accessing a relevant website via the popup window. For example, as illustrated in FIG. 15, the communication terminal may determine whether to load a CSS, JavaScript, an image, etc. as illustrated in FIG. 15. The access information displayed via the popup window may be deleted or added according to a company or a user. In addition, when the tapping or the drag occurs, the communication terminal may control the display of information representing a loading time or a loading speed at the upper end of a relevant bookmark as illustrated in FIG. 16.

As illustrated in FIG. 17, when displaying the bookmark in step 903, the communication terminal may display a loading time or a loading speed for each bookmark. Here, the loading time or the loading speed may be classified for each step and represented using color, figure, an image, etc., and represented using a number as illustrated in FIGS. 16 and 17. For example, the loading time or the loading speed may be represented by adding a badge-shaped icon on each bookmark, or changing a background color, or changing color, a font, a size, etc. of a relevant website title.

The communication terminal determines whether an event for selecting a specific bookmark occurs in step 909. For example, the communication terminal determines whether the specific bookmark is touched for more than a predetermined time. When the specific bookmark is not selected, the communication terminal returns to step 905 to re-perform subsequent steps. When the specific bookmark is selected, the communication terminal accesses a webpage corresponding to the bookmark in step 911.

In contrast, when the tapping or the drag for the specific bookmark does not occur as a result of the determination in step 905, the communication terminal determines whether a screen magnify/reduce event occurs in step 913. The screen magnify/reduce may occur through specific key input or drag, or a user operation. When the screen magnify/reduce event does not occur, the communication terminal returns to step 905 to re-perform subsequent steps.

In contrast, when the screen magnify/reduce event occurs, the communication terminal magnifies or reduces a screen including the bookmark according to the screen magnify/reduce degree in step 915. When the magnify degree is more than a threshold, the communication terminal controls the display of an image of the website corresponding to each bookmark instead of the favicon set as the bookmark. The image of the website may be an image obtained in advance during an access to the relevant website. For example, as illustrated in FIG. 18, when a screen magnify event occurs, the communication terminal magnifies the screen. When the magnify degree becomes more than a threshold, the communication terminal displays and magnifies a screen including an image of the website corresponding to the bookmark instead of the bookmark. When the screen including the website image is magnified continuously and reaches a maximum threshold, the communication terminal may access a website having a largest display portion on the screen.

In the above exemplary embodiment, the communication terminal sets a favicon as a bookmark and then gives an image effect or maps access information. Even in case of a bookmark that does not use a favicon, the communication terminal may give an image effect and map access information. In addition, the communication terminal may give an image effect for a general icon, and not a bookmark of a website.

Exemplary embodiments of the present invention set a favicon provided for each website as a bookmark, give an image effect to the bookmark, and represents website access information via the bookmark in a communication terminal, so that a user may easily recognize the website represented by each bookmark, satisfaction of an individual user may be raised, and more information for a relevant website may be provided.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a bookmark service in a communication terminal, the method comprising:
    accessing a website;
    obtaining at least one of a website image and a favicon corresponding to the accessed website;
    setting the favicon or the website image as a bookmark of the website;
    when the bookmark display event occurs, displaying the bookmark corresponding to each website; and
        when a user input on a specific bookmark occurs, selectively displaying access-related information of the website corresponding to the specific bookmark,
        wherein the access-related information comprises at least one of a last access time, a loading time, a loading speed, and a loading data,
        wherein the access related information is mapped to the favicon or the website image, and
        wherein the access-related information is selectively displayed based on the type of the user input, the type of user input including at least one of a light tap on the specific bookmark, a tap on the specific bookmark for more than a predetermined time, and a double tap on the specific bookmark.

2. The method of claim 1, further comprising: when the favicon does not exist in the website, selecting one icon from previously stored icons, and setting the selected icon as the bookmark of the website.

3. The method of claim 1,
wherein the favicon is obtained based on at least one of a root of a server of the website and meta data of the website, and
wherein the meta data comprises at least one of a Uniform Resource Locator (URL) of the website, a favicon, and other Hyper Text Markup Language (HTML) field information.

4. The method of claim 1, further comprising:
when the favicon exists, applying an image effect to the relevant favicon,
wherein the image effect comprises at least one of vectorization, smooth-process, rotation, color control, brightness control, size control, a shadow effect, and a frame addition.

5. The method of claim 1, further comprising:
when accessing the website, obtaining the access-related information of the accessed website; and
mapping the access-related information to the bookmark of the website and storing the access-related information.

6. The method of claim 1, further comprising:
when the bookmark is tapped or dragged, displaying a window for setting a kind of data to be loaded from a relevant website; and
allowing a user to set the kind of the data to be loaded.

7. The method of claim 1, further comprising:
when a screen display ratio control event occurs with bookmarks for each website displayed, performing at least one of magnification and reduction of a screen comprising the bookmark according to a screen display ratio; and
when the screen display ratio exceeds a threshold, displaying the website image instead of the bookmark on the screen.

8. An apparatus for providing a bookmark service in a communication terminal, the apparatus comprising:
a touch screen display; and
a controller communicatively coupled to the touch screen display and configured to:
obtain, when a website is accessed, at least one of a website image and a favicon corresponding to the accessed website,
set the favicon or the website as a bookmark of the website, when the bookmark display event occurs,
display, on the touch screen display, the bookmark corresponding to each website, and
selectively display, when a user input on a specific bookmark occurs on the touch screen display, access-related information of the website corresponding to the specific bookmark,
wherein the access-related information comprises at least one of a last access time, a loading time, a loading speed, and a loading data,
wherein the access related information is mapped to the favicon or the website image, and
wherein the access-related information is selectively displayed based on the type of the user input, the type of user input including at least one of a light tap on the specific bookmark, a tap on the specific bookmark for more than a predetermined time, and a double tap on the specific bookmark.

9. The apparatus of claim 8, wherein when the favicon does not exist in the website, the controller is further configured to select one icon from previously stored icons and sets the selected icon as the bookmark of the website.

10. The apparatus of claim 8,
wherein the controller is further configured to obtain the favicon based on at least one of a root of a server of the website and meta data of the website, and
wherein the meta data comprises at least one of a Uniform Resource Locator (URL) of the website, a favicon, and other Hyper Text Markup Language (HTML) field information.

11. The apparatus of claim 8, wherein when the favicon exists, the controller is further configured to apply an image effect to the relevant favicon, and the image effect comprises at least one of vectorization, smooth-process, rotation, color control, brightness control, size control, a shadow effect, and a frame addition.

12. The apparatus of claim 8, wherein when accessing the website, the controller is further configured to obtain the access-related information of the accessed website, and the apparatus further comprises:
a storage unit configured to:
map the obtained access-related information to the bookmark of the website, and
store the access-related information.

13. The apparatus of claim 8, wherein when the bookmark is tapped or dragged on the touch screen display, the controller is further configured to display a window for setting a kind of data to be loaded from a relevant website on the display unit to allow a user to set the kind of the data to be loaded.

14. The apparatus of claim 8,
wherein when a screen display ratio control event occurs with bookmarks for each website displayed, the controller is further configured to perform at least one of magnification and reduction of a screen displayed on the touch screen display comprising the bookmark according to a screen display ratio, and
wherein when the screen display ratio exceeds a threshold, the controller is further configured to display the website image instead of the bookmark on the screen.

15. A communication terminal, comprising:
a communication unit configured to communicate with a web server;
a controller including a bookmark manager configured to:
obtain at least one of a website image and a favicon corresponding to the accessed website, and
set the favicon or the website image as a bookmark for the website; and
a display unit configured to display a user interface including the bookmark and access-related information of the website associated with the bookmark,
wherein the access-related information comprises at least one of a last access time, a loading time, a loading speed, and a loading data,
wherein the access related information is mapped to the favicon or the website image, and
wherein when a user input occurs on a specific icon corresponding to the bookmark displayed on the display unit, the controller is further configured to control the display unit to selectively display the access-related information corresponding to the website associated with the bookmark based on the type of the user input, the type of user input including at least one of a light tap on the specific bookmark, a tap on the specific bookmark for more than a predetermined time, and a double tap on the specific bookmark.

16. The communication terminal of claim 15, further comprising: a storage unit configured to store the favicon corresponding to the bookmark and the access-related information corresponding to the website associated with the bookmark.

17. The communication terminal of claim 15, wherein, when the favicon is present in the website, the controller is further configured to perform an image effect on the favicon and set the changed favicon as the bookmark for the website.

* * * * *